W. J. MacFARLAND & W. G. EATON.
DIE.
APPLICATION FILED FEB. 3, 1911.
Reissued Apr. 18, 1911.
13,228.
Fig. 2.
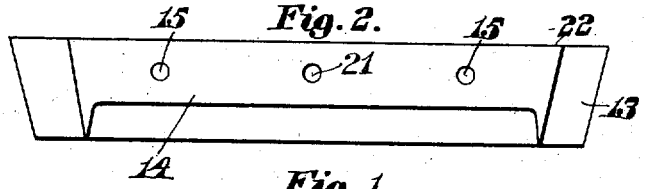
Fig. 1.
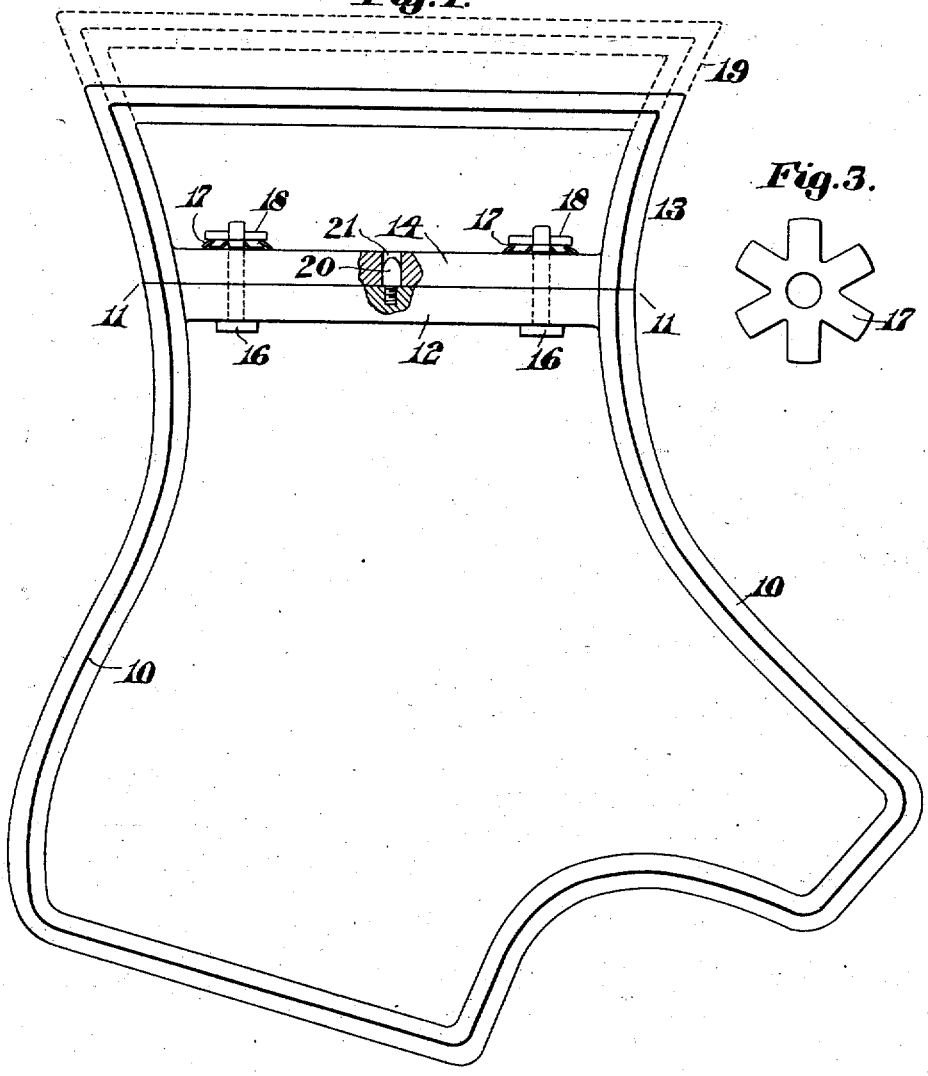
Fig. 3.
Witnesses:
Nathan C. Lombard
Mary C. Smith
Inventors:
William J. MacFarland
William G. Eaton,
by Walter E. Lombard,
Atty.
THE NORRIS PETERS CO., WASHINGTON, D. C.

UNITED STATES PATENT OFFICE.

WILLIAM J. MACFARLAND, OF DORCHESTER, AND WILLIAM G. EATON, OF HULL, MASSACHUSETTS.

DIE.

13,228. Specification of Reissued Letters Patent. Reissued Apr. 18, 1911.

Original No. 950,003, dated February 22, 1910, Serial No. 489,945. Application for reissue filed February 3, 1911. Serial No. 606,448.

*To all whom it may concern:*

Be it known that we, WILLIAM J. MACFARLAND, a citizen of the United States of America, and a resident of Dorchester, in the county of Suffolk and State of Massachusetts, and WILLIAM G. EATON, a citizen of the United States of America, and a resident of Hull, in the county of Plymouth and State of Massachusetts, have invented certain new and useful Improvements in Dies, of which the following is a specification.

This invention relates to sectional dies and has for its object the production of a die made in two sections which may be securely locked together when in use and separated at the will of the operator for the purpose of replacing one of the sections by a section of different shape.

The invention consists of a die, one section of which has a cutting blade of irregular form, the ends of which are connected by a stiffening web and are adapted to register with the ends of the cutting blade of another section, which ends are connected together by means of another stiffening web having a face contacting with the face of the first-mentioned stiffening web to which it is connected by any suitable locking mechanism. The cutting blade is provided with an upper surface substantially flat to permit pressure to be exerted directly upon the blade over its entire length to facilitate the forcing of the cutting edge through the stock.

The invention further consists in certain novel features of construction and arrangement of parts which will be readily understood by reference to the description of the drawings and to the claims hereinafter given.

Of the drawings: Figure 1 represents a plan of a sectional die embodying the features of the present invention. Fig. 2 represents an elevation of one section of the same, and Fig. 3 represents an enlarged detail of the spring washer used upon the locking members connecting the two sections together.

Similar characters designate like parts throughout the several figures of the drawings.

In the drawings, 10 represents one section of the cutting die, the cutting blade of which is of irregular outline with the two ends thereof terminating at 11 and connected by a stiffening web 12 of less depth than the depth of the cutting blades, as indicated clearly in Fig. 2 of the drawings. A second section 13 complementary to the section 10 has the ends of its cutting blade connected together by means of the stiffening web 14. The sections 10 and 13 are locked together by any desirable locking mechanism so that the ends of the cutting blades of the two sections 10 and 13 register accurately with one another so that when thus locked together and the die is used the cutting blade is continuous and can cut from any piece of material a blank of desired shape.

Both stiffening webs 12 and 14 are provided with openings 15 therethrough registering accurately with one another through which the headed pin 16 extends, the smaller end of each pin 16 extending through a spring washer 17 and being provided with an opening therethrough through which extends a locking pin 18. The pin 18 is driven through the pin 16 so that the spring washer 17 is compressed in such a manner that the tension thereof will tend to retain the contacting faces of the stiffening members 12 and 14 in constant contact. When a different shaped blank is desired to be cut it is obvious that by removing the locking pins 16, section 13 may be removed and a different shaped section, as, for instance, 19, shown in dotted lines in Fig. 1, may be secured thereto by the same locking devices. While one means of locking the two sections together is shown in the drawings it is obvious that other means for locking the two members may be provided without altering the scope of the present invention.

The stiffening webs 12 and 14 are made integral with the cutting edges of the sections 10 and 13, giving great rigidity to the die and retaining the shape of the different sections thereof under all conditions. A stud 20 is threaded to the stiffening member 12 and projects therefrom, being adapted to enter the opening 21 in the web 14 to accurately register the two sections 10 and 13 to each other.

The upper face 22 of the cutting blades is preferably substantially flat to permit pressure to be exerted directly to the blade in the manner and for the purpose herein stated.

It is believed that the operation of the invention and the many advantages of a sectional die constructed as set forth is so obvious as to require no further description.

Having thus described our invention, we claim:

1. A cutting die composed of two sections having cutting edges, the ends of which are adapted to register with each other and are connected by stiffening members having contacting faces and perforations extending through one of said members at right angles to its contacting face; pins on the other member extending through said perforations; spring washers on said pins; and means co-acting with said pins for locking the two sections together.

2. A cutting die composed of two sections provided with cutting blades having their upper faces substantially flat, and each having two ends which are adapted to register with the ends of the other, the ends of each section being connected by a non-cutting stiffening member formed integral therewith, in combination with means co-acting with said members for locking the two sections together.

3. A cutting die composed of two sections provided with cutting blades having their upper faces substantially flat, and each having two ends which are adapted to register with the ends of the other, the ends of each section being connected by a non-cutting stiffening member having contacting faces and perforations extending through one of said members at right angles to its contacting face; pins on the other member extending through said perforations; and means co-acting with said pins for locking the two sections together.

4. A cutting die composed of two sections provided with cutting blades having their upper faces substantially flat, the ends of which are separated but permanently connected by a stiffening member integral with said blade; and means extending from one of said members to the other for locking said sections together with the ends of said blades abutting and in alinement.

5. In a device for cutting quarters, a main cutting section adapted to have supplemental cutting sections of varying sizes secured thereto to cut different heights, each section being provided with a cutting blade, the ends of which are adapted to register with the ends of the cutting blade of the other section and are connected by stiffening members formed integral therewith; and means co-acting with said stiffening members to lock said supplemental and said main sections together.

Signed by us at 4 Post Office Sq., Boston, this 19th day of January, 1911.

WILLIAM J. MACFARLAND.
WILLIAM G. EATON.

Witnesses:
WALTER E. LOMBARD,
NATHAN C. LOMBARD.

Copies of this patent may be obtained for five cents each, by addressing the "Commissioner of Patents, Washington, D. C."